H. M. NAUGLE.
LUBRICATING BOLT.
APPLICATION FILED JULY 23, 1919.

1,389,375.

Patented Aug. 30, 1921.
2 SHEETS—SHEET 1.

INVENTOR,
Harry M. Naugle,
BY Frease, Merkel, Saywell and Bond
ATTYS.

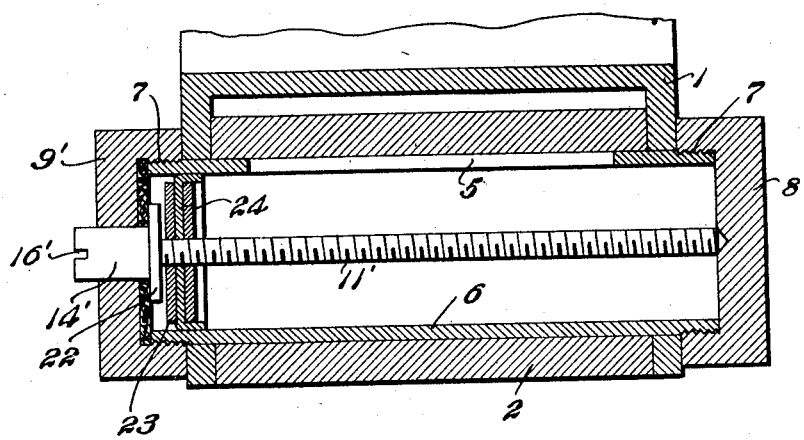

UNITED STATES PATENT OFFICE.

HARRY M. NAUGLE, OF CANTON, OHIO, ASSIGNOR TO THE ALLOY PARTS MANUFACTURING COMPANY, OF CANTON, OHIO, A CORPORATION OF OHIO.

LUBRICATING-BOLT.

1,389,375.   Specification of Letters Patent.   Patented Aug. 30, 1921.

Application filed July 23, 1919. Serial No. 312,794.

*To all whom it may concern:*

Be it known that I, HARRY M. NAUGLE, a citizen of the United States, residing at Canton, in the county of Stark and State of Ohio, have invented a new and useful Lubricating-Bolt, of which the following is a specification.

The invention relates to lubricating spring bolts of the type used in automobiles and similar vehicles for connecting the springs to the frame of the machine or to the shackles or for any other mechanism, in which a bolt is used for a bearing; and the objects of the invention are to provide a hollow lubricating bolt, the hollow interior of the bolt comprising a grease or oil chamber within which is located suitable means operable from the exterior to force the grease or oil through slots or apertures in the bolt; to provide further distribution of lubrication on the bearing surface; to provide a simple and inexpensive bolt of this character formed from a flat sheet metal blank pressed into proper shape and having its adjoining edges welded together.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Fig. 4 is a view similar to Fig. 3, showing a modified form of bolt.

Fig. 5 is a similar view showing a further modification.

A practical embodiment of the invention is disclosed in the accompanying drawings, forming a part of this specification in which similar numerals of reference indicate corresponding parts throughout the several views.

The bolt is made in the form of a hollow open ended cylinder, preferably stamped from a metal sheet or plate of proper thickness and shape to form the finished bolt with a slot or aperture around its periphery, the adjoining edges of the blank being butt welded together.

Figure 1:
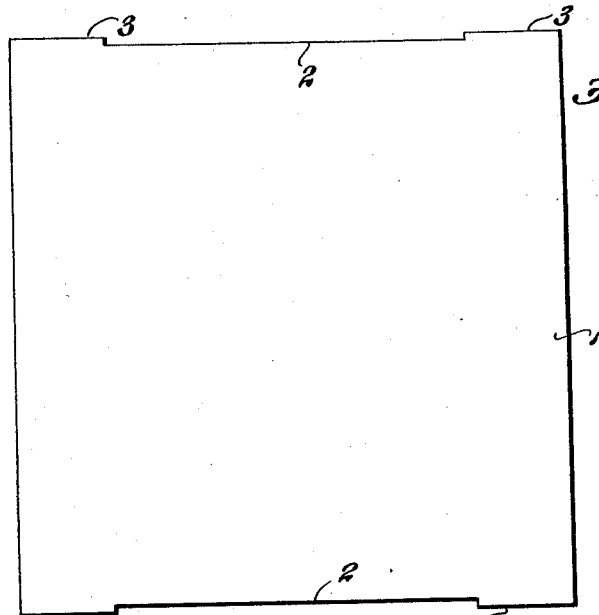
Figure 1 is a plan view of a gland from which the bolt is formed.
Figure 2:
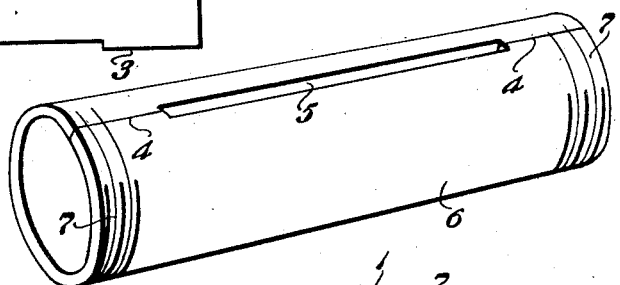
Fig. 2 is a detail perspective view of the bolt.

In Fig. 1 is illustrated a plan view of the blank illustrated generally by the numeral 1, said blank being preferably stamped with the cut-out portions 2 along opposite edges. This blank is formed in cylindrical shape, the edges 3 upon each side of the blank being brought together and "spot" welded as indicated at 4 the cut-out portions forming a longitudinal slot 5 in the finished bolt 6. The bolt is then screw threaded as shown at 7 upon both ends thereof for the purpose of receiving the nuts 8 and 9.

A portion of the frame of the chassis of an automobile is indicated at 1 and a portion of the leaf spring 2 is shown connected thereto, the bolt being located through the eye of the spring in the usual manner.

The nut 8 is provided with a closed end 10 forming a head for the bolt. A grease or oil chamber is thus formed within the bolt, the slot 5 forming means of communication between said chamber and the bearing, the bolt is passed through the bearings in the frame or through the bearings in a shackle and spring, the nut or head 8 engaging the shackle and the nut 9 holding the bolt in position within the bearing.

The oppositely threaded shaft 11 is mounted through the longitudinal center of the bolt and is provided with the tapered extremity 12 arranged to be located in a suitable socket 13 formed in the head 10. The other extremity of the shaft is provided with a head 14 which has a bearing in the screw threaded block 15 which is internally threaded into the nut 9. The head 14 extends through the plug 15 and is provided with the slot 16 for the reception of a screw driver or other tool.

Mounted upon the threaded shaft 11 are the oppositely threaded plungers 17 and 18. Each of these plungers comprises two spaced metal disks provided with a bearing portion, the disks being of slightly less diameter than the diameter of the grease chamber within the bolt and a washer 19 of felt or similar material and extends inwardly over the edge of the inner disk preventing leakage of grease or oil between the periphery of the plunger and the inner surface of the grease chamber.

Figure 3:
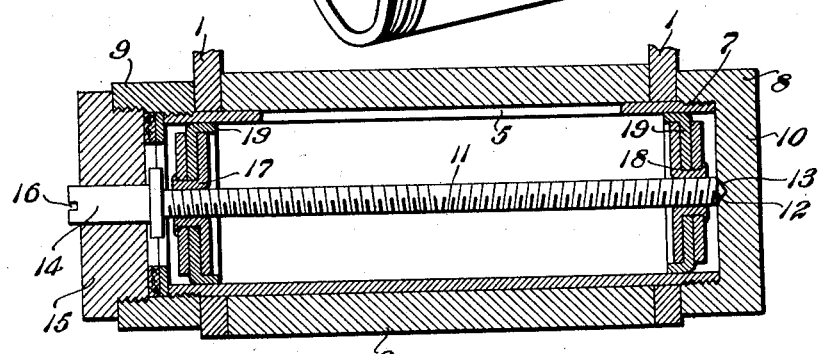
Fig. 3 is a longitudinal sectional view through the bolt, showing portions of a vehicle spring and frame.

In the form of the invention shown in Fig. 3 the plungers are initially located near opposite extremities of the grease chamber, and arranged to be moved toward each other with the rotation of the oppositely threaded shaft 11 to the left, forcing the grease or oil from the grease chamber through the slot 5 and distributing the lubricant around the bearing surface of the bolt.

In order to keep the bearing properly lubricated, a screw driver or coin is from time to time, placed in the slotted head of the screw threaded shaft and given a few turns to the left, drawing the plungers toward each other and forcing the grease through the slot 5 and distributing the lubricant around the bearing surface.

In Fig. 4 is illustrated a modified form of the bolt. In this figure the chassis frame 1, spring 2 and bolt proper 6 are of the same construction as that shown in Fig. 3, the bolt being provided with the slot 5. The bolt is screw threaded at each end as shown at 7, the nut 8 being provided upon one end and a similar nut 9' being provided upon the other end.

The screw threaded shaft 11' is mounted within the grease chamber and provided with the head 14' extending through a suitable bearing in the nut 9', this head extending beyond the nut and provided with a slot 16' for the reception of a screw driver or other instrument. A washer 21 of leather or similar material is located at the extremity of the bolt and the nut 9', the collar 22 being provided upon the bolt adjacent said washer. A plunger 23 is mounted upon the shaft 11' and provided with the washer 24 of felt or other suitable material, the edges thereof being turned over the plunger to prevent leakage of grease or oil between the plunger and the inner surface of the grease chamber.

When it is desired to refill this type of bolt, the threaded shaft is first turned to the initial position shown in Fig. 4, after which the nut 9' is removed and the shaft withdrawn. The chamber may then be packed with grease and the shaft and nut replaced.

In Fig. 5 is shown a further modification. In this form the bolt is shown applied to the chassis 1 and spring 2 in the usual manner, but the bolt 6' is provided with only a small aperture 5' near one extremity in place of the slot 5. This type of bolt is best adapted for use with oil rather than grease.

For the purpose of filling the bolt the nut 8' is provided with a channel 24 communicating with the interior of the bolt and arranged to be closed with a threaded plug 25. The threaded shaft 26 provided with a conical end 27 having a bearing in the conical socket 28 formed in the nut 8'. The other end of the threaded shaft is squared as shown at 30 and arranged to be received into the squared socket 31 formed in the thimble 32 which is rotatably mounted in the nut 33 and held against lateral movement therein by means of the flanges 34. The slot 35 is provided in the outer end of the thimble for the reception of a screw driver. A plunger 36 provided with a felt washer 37 is provided upon the screw threaded shaft. When access to the interior of the bolt is desired it is only necessary to remove the nut 33, the thimble 32 being removed therewith.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim—

1. A hollow bearing bolt formed of a sheet of metal having cut-out portions in opposite edges, the edges of the sheet adjacent said cut-out portions being welded together.

2. A hollow bearing bolt formed of a metal blank pressed into cylindrical form and having spaced, off-set portions at the meeting edges thereof, the adjoining edges of the blank being welded together at said spaced off-set portions, the finished bolt having an aperture at the joint.

3. A hollow bearing bolt formed of a metallic blank having off-set portions upon opposite edges pressed into cylindrical form, the off-set portions of adjoining edges being welded together, a slot being formed in the joint between the off-set portions.

4. A hollow bearing bolt having a longitudinal aperture through its side and provided with screw threaded extremities, caps mounted upon said screw threaded extremities inclosing each end of the bolt, a threaded shaft journaled in said caps and a plunger mounted upon said threaded shaft to compress a lubricant within the bolt.

5. A hollow bearing bolt having an aperture through its side and provided with screw threaded extremities, a cap mounted upon each screw threaded extremity closing the ends of the bolt, a thimble provided with a squared socket journaled in one of said caps, a threaded shaft having a squared portion located in said thimble, the other end of said shaft journaled in the other cap, and a plunger mounted upon said shaft to compress a lubricant within the bolt.

6. A hollow bearing shaft having a longitudinal aperture through its side and provided with screw threaded extremities, caps mounted upon said screw threaded extremities closing the ends of the bolt, a threaded shaft journaled in said caps, a plunger mounted upon said shaft to compress a lubricant within the bolt and a filling channel provided in one of said caps and communicating with the interior of said hollow shaft.

7. A hollow bearing bolt having an aperture through its side and provided with screw threaded extremities, a cap provided upon one screw threaded extremity, a nut mounted upon the other screw threaded extremity, a screw threaded plug mounted within said nut, a screw threaded shaft journaled in said cap and said plug and a plunger mounted upon the screw threaded shaft to compress a lubricant within the bolt.

In testimony that I claim the above, I have hereunto subscribed my name.

HARRY M. NAUGLE.